USO09619245B1

(12) United States Patent
Ramanujam

(10) Patent No.: US 9,619,245 B1
(45) Date of Patent: Apr. 11, 2017

(54) METHOD AND APPARATUS FOR CONFIGURING AND BOOTING WITH MORE THAN ONE PROTOCOL USING SINGLE OPTION ROMBIOS CODE ON MULTI FUNCTION CONVERGED NETWORK ADAPTER

(71) Applicant: Chelsio Communications, Inc., Sunnyvale, CA (US)

(72) Inventor: Mahendra Boopathy Ramanujam, Chennai (IN)

(73) Assignee: Chelsio Communications, Inc., Sunnyvale, CA (US)

(*) Notice: Subject to any disclaimer, the term of this patent is extended or adjusted under 35 U.S.C. 154(b) by 531 days.

(21) Appl. No.: 13/631,266

(22) Filed: Sep. 28, 2012

Related U.S. Application Data

(60) Provisional application No. 61/540,992, filed on Sep. 29, 2011.

(51) Int. Cl.
*G06F 9/44* (2006.01)
*G06F 3/06* (2006.01)

(52) U.S. Cl.
CPC .......... *G06F 9/4416* (2013.01); *G06F 9/4411* (2013.01); *G06F 3/067* (2013.01)

(58) Field of Classification Search
CPC .............................. G06F 9/4411; G06F 9/4416
USPC ............................................................ 713/2
See application file for complete search history.

(56) References Cited

U.S. PATENT DOCUMENTS

| 6,425,079 | B1* | 7/2002 | Mahmoud | 713/2 |
| 6,446,139 | B1* | 9/2002 | Leung | G06F 9/4411 710/1 |
| 8,566,573 | B1* | 10/2013 | Lok et al. | 713/2 |
| 2002/0144242 | A1* | 10/2002 | Owhadi | 717/137 |
| 2003/0074491 | A1* | 4/2003 | Cepulis | G06F 9/4411 710/2 |
| 2006/0218388 | A1* | 9/2006 | Zur et al. | 713/2 |
| 2008/0276011 | A1* | 11/2008 | Bircher | G06F 12/023 710/8 |

* cited by examiner

*Primary Examiner* — Thomas Lee
*Assistant Examiner* — Danny Chan
(74) *Attorney, Agent, or Firm* — Beyer Law Group

(57) ABSTRACT

A converged network adapter card utilizes a single option ROM to support configuring and booting the protocols of the multifunction converged network adapter. In one embodiment the single option ROM stores a sequence of images to: 1) support configuring and booting the network interface card (NIC) and storage protocols supported by the converged network adapter card and 2) support all of the boot solutions for the converged network adapter card.

11 Claims, 8 Drawing Sheets

METHOD AND APPARATUS FOR CONFIGURING AND BOOTING WITH MORE THAN ONE PROTOCOL USING SINGLE OPTION ROMBIOS CODE ON MULTI FUNCTION CONVERGED NETWORK ADAPTER

CROSS REFERENCE TO RELATED APPLICATIONS

The present application claims the benefit of U.S. provisional application 61/540,992 filed Sep. 29, 2011, the contents of which are hereby incorporated by reference.

FIELD OF THE INVENTION

The present invention relates generally to the field of computing technology, and more particularly, to methods and structures for using a single option Read Only Memory (ROM) image to configure and boot a computer system using one or more converged network adapters or a set of adapters.

BACKGROUND OF THE INVENTION

A Converged Network Adapter (CNA) supports Network Interface Card (NIC) functions and Host Bus Adapter (HBA) functions to provide I/O processing and connectivity to storage area devices via protocols, such as Fiber Channel over Ethernet (FCoE) and Internet Small Computer System Interface (iSCSI). A CNA is commonly implemented on a card with other features.

Examples of CNAs include the T4 ASIC design developed by Chelsio Communication, Inc., of Sunnyvale, Calif. The T4 (fourth generation terminator) is a highly integrated 10 GbE controller chip built around a programmable protocol-processing engine. It includes a Peripheral Component Express (PCIe) interface for a host computer system interface. On a network side, the T4 ASIC includes four Ethernet ports. Network Interface Card (NIC) offload processing is supported. Among other features, the T4 ASIC supports storage offload features for iSCSI and FCoE protocols.

SUMMARY OF THE INVENTION

A method, apparatus, and computer program product is disclosed for configuring and booting a computer system using a converged network adapter using a single option ROM. In one embodiment, a method includes a system BIOS of a computer system reading a single option ROM associated with the CNA card to obtain information for booting and configuration. The single option ROM has a sequence of images to support all of the protocols of the adapters of the CNA, and supports all of the boot solutions for the converged network adapter card.

DETAILED DESCRIPTION

Figure 1:
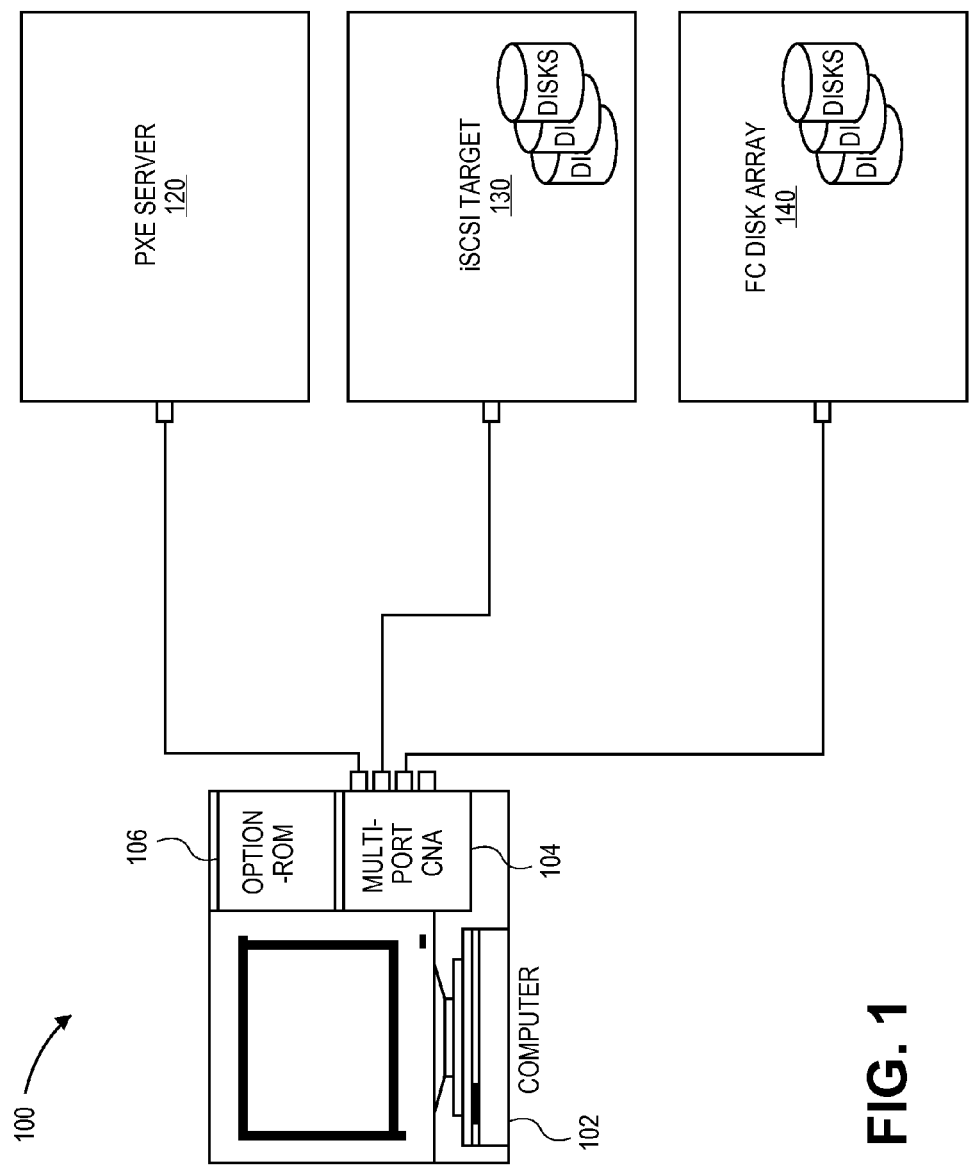
FIG. 1 illustrates a converged network adapter with a single option ROM supports booting and configuration in accordance with one embodiment of the present invention.

FIG. 1 illustrates an exemplary environment for practicing the present invention. A computer system 100 includes a computer 102 having a Converged Network Adapter (CNA) card 104. The CNA may, for example, support data rates of 10 Gb or above. In one embodiment, the CNA card supports eight physical PCIe functions (PF0-PF7). A host interface to the computer system may, for example, be a PCIe interface. A set of network interfaces are provided (e.g., four ports). For the purposes of illustration, the computer system is shown in communication with a Fiber Channel (FC) disk array 140, iSCSI target 130, and a Preboot Execution Environment (PXE) server 120, where PXE is an environment to boot computers using a network interface independently of data storage devices, or installed operating systems.

One concern with the CNA card 104 is efficiently booting and configuring the computer system with it using minimal memory and ROM resources. In accordance with an embodiment of the present invention, a single option ROM 106 is used to support the different protocols and boot options for the CNA card.

The single option ROM 106 may be located on the CNA card as flash memory, but more generally, the option ROM may also be in communication with the CNA card. While a single option ROM 106 is used to support the different protocols and boot options for the CNA card, it will be understood that the computer system 100 may include other option ROMs for unrelated functions.

In one embodiment, the single option ROM 106 supports PXE, FCoE and iSCSI boot functionality, in addition to NIC functions, such that it provides a unified boot solution for a converged network adapter.

Figure 2:
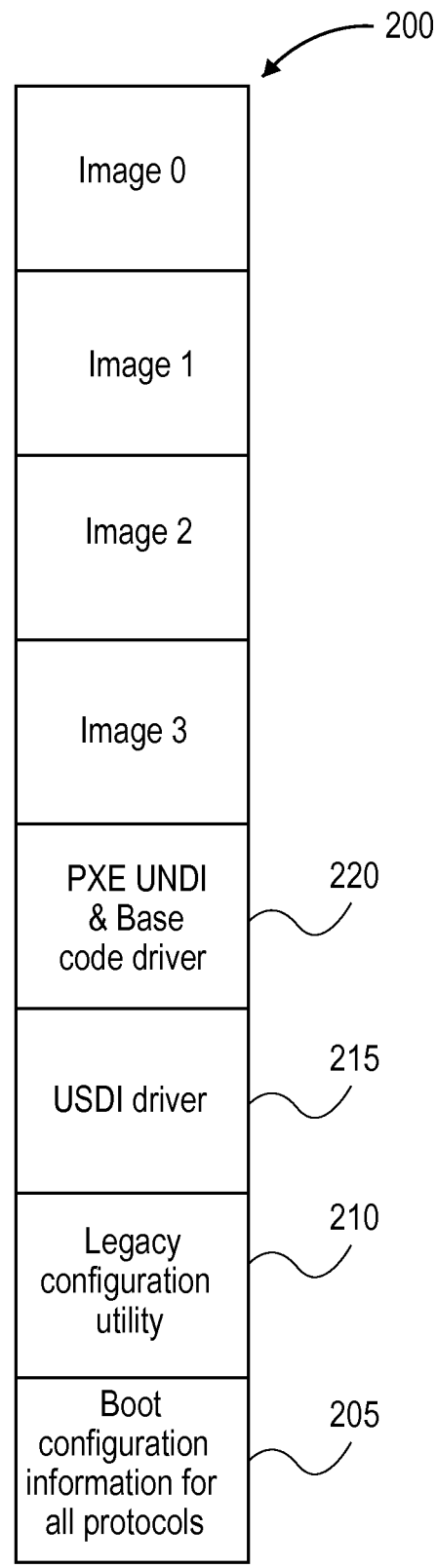
FIG. 2 illustrates a set of images stored on the single option ROM of FIG. 1 in accordance with one embodiment of the present invention.

Referring to FIG. 2, in one embodiment, the single option ROM (e.g., a flash memory) has a sequence of images that supports configuring and booting using the CNA card in the computer system with all of the CNA protocols, and serves all of the boot solutions for different target devices. This eliminates the need to update functions with an additional optional ROM image and reduces the memory foot print as only one option ROM is loaded into memory and initialized.

FIG. 2 illustrates that the image allocation in the flash of the single option ROM may include a sequence of images that include boot configuration information 205 for all protocols of the CNA, a legacy configuration utility 210, a universal stored device interface (USDI) driver 215 supporting at least FCoE and iSCSI, a preboot execution environment (PXE), and a universal network device interface (UNDI) and base code driver 220 supporting NIC functions.

The system BIOS of the computer (not shown in FIG. 1) can read the single option ROM and obtain the necessary information to configure and boot with the CNA.

As previously discussed, the option ROM may be implemented in different ways. An option ROM approach typically includes firmware that is called by the system BIOS of a computer. For example, a CNA card that controls a boot device might contain firmware that is used to connect the CNA device once the option ROM is loaded. As an example, option ROMs are commonly used with standard IBM PC compatible BIOS of most desktop computers.

Another example of an option ROM is the video BIOS found on all standard PC video cards. This is a special case of an option ROM, as it is loaded very early on in the boot process (otherwise nothing would appear on the screen during Power-On-Self Test (POST)). It is usually easy to tell when this particular ROM is initialized, as it is the first time something appears on the monitor since the computer was switched on. Unless working with an embedded system, the video BIOS is almost always located in the 0C000h memory segment (i.e. the very start of the memory area reserved for option ROMs.) Other ROMs can be located from segments 0C800h all the way up to 0E000h. The BIOS Boot Specification (BBS) requires that option ROMs be aligned to 2 KB boundaries (e.g. segments 0C800h, 0C880h, 0C900h, 0C980h, etc.)

Another common option ROM is a network boot ROM (e.g., a PXE option ROM). This allows a computer without any disks or persistent storage to run an OS by downloading the necessary software over the network. Of course, there needs to be some program to do this download of code, and this is what is stored in the option ROM.

The CNA's storage functions may hook INT 13h which is responsible for providing disk services. The primary interface to the BIOS has been the software interrupt known as INT 13h. When OS or an application wants to access the hard disk, it employs BIOS services to do this. Once it has done this, any subsequent calls to INT 13h will be "caught" by the option ROM is known as the Universal Storage Device Interface (USDI) BIOS, allowing it to insert details about any disks that may exist on the FCoE or iSCSI as SCSI disks. Before it had hooked the interrupt, there may have been no disks on the system, but by intercepting the interrupt and altering the values returned, the USDI BIOS can make only discovered disks visible to the system.

The single option ROM can be read by the system BIOS, such as, during a system BIOS Power On Self Test (POST), to support configuring and booting with a CNA.

First Example Adapter/CNA and Method

Figure 3:
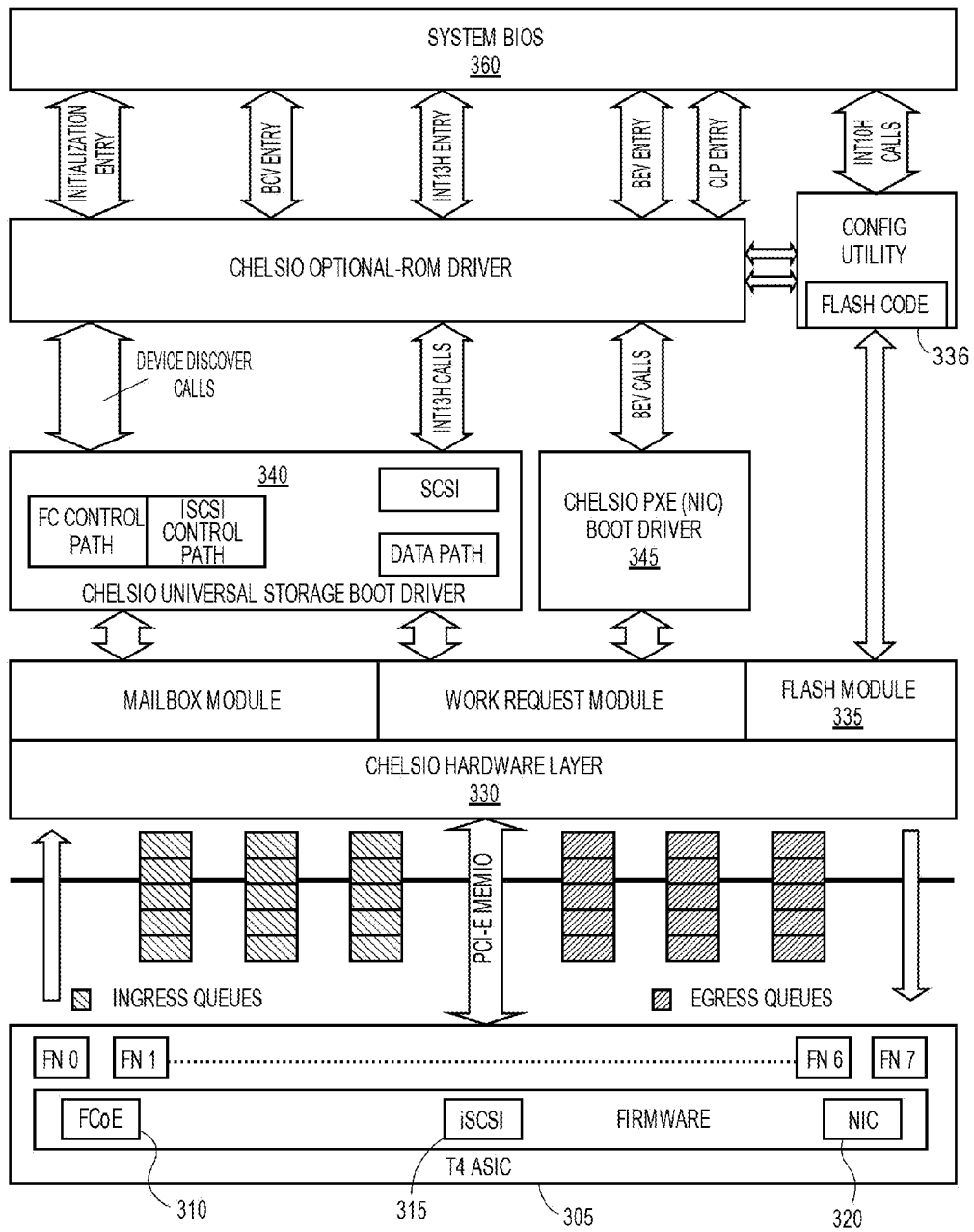
FIG. 3 illustrates interaction of a converged network adapter with a system BIOS in accordance with one embodiment of the present invention.

FIG. 3 illustrates a first example of a CNA having an Application Specific Integrated Circuit (ASIC) 305, developed by Chelsio Communication, Inc. (corresponding to a version of a T4 adapter ASIC), including firmware, associated hardware 330, a flash module 335 and flash memory interface 336. The firmware of the ASIC also includes modules to support FCoE 310, iSCSI 315 and NIC 320. Eight physical PCIe functions (FN0-FN7) are supported.

The diagram shows the interaction of the different parts of the image among themselves, and also with the device firmware and system BIOS 360. Communication flows with the system BIOS 360 include initialization entry, BCV entry, INT 13H Entry, and BEV Entry.

The Bootstrap Entry Vectors (BEVs) are pointers that point to code inside an option ROM that will directly load an Operating System (OS).

The Boot Connection Vector (BCV) is a pointer that points to code inside the option ROM that will perform device initialization, detect if a peripheral (such as a SCSI hard drive) is attached, and optionally hook INT 13h. The BCV resides in a PnP option ROM Expansion Header. An example of an option ROM with a BCV is a PCI SCSI controller.

The BEV resides in a PnP option ROM Expansion Header. An example of an option ROM with a BEV is a PCI Ethernet controller.

The system BIOS provides various software routines, or sub programs, that are called by high-level software like OS, that are known as BIOS services. BIOS services are accessed using software interrupts, which is similar to the hardware interrupts, except they are generated inside the processor by programs instead of being generated outside the processor by hardware devices.

In the embodiment of FIG. 3, the option ROM image resides in the flash memory module 335 starting from sector 0 and extending all the way up to and including sector 7. Sector 7 consists of the configuration parameters that are accessed by the configuration utility to save user configured parameters, and also by the option ROM to figure out the user configured parameters.

The option ROM of the flash memory module 335 includes initialization code that the BIOS calls during Power On Self Test (POST). It verifies the NIC, iSCSI and FCoE Configuration, and signals the BIOS that the NIC is BEV bootable device, whereas iSCSI or FCoE is BCV bootable device.

In the embodiment of FIG. 3, a unified boot driver 340 includes a PXE boot driver 345. The FCoE boot and iSCSI boot driver together form the universal storage boot driver 340 as shown in the diagram. The universal storage boot driver 340 includes the FC control path for FCoE commands and data and iSCSI control path for iSCSI commands and data. The drivers send and receive data to or from the firmware through mailbox commands or work requests, using respective mailbox or work request interfaces.

In one embodiment, the option ROM image is loaded into memory by system BIOS, and a call is made to the initialization routine. This routine then scans for all of the adapters present on the system, reads the configuration parameters stored in flash memory on each adapter found, and proceeds to set up PXE BEV entries and storage BCV entries based on the parameters read. This enables the user to use one adapter present on the system for PXE boot, one for FCoE boot and another for iSCSI boot without actually having separate option ROM images on all of them.

The PXE BEV entries are set up based on whether the NIC function BIOS on a T4 adapter is enabled or not. In one embodiment there are four NIC functions on the adapter and enabling/disabling of their BIOS can be done in the configuration utility. Once PXE BEV entries are set up, the FCoE storage driver takes over and checks if the FCoE storage BIOS is enabled, and if yes, initializes the firmware and sets up ingress and egress queues, then tries to discover the FCoE boot target that is saved in flash memory.

After a successful discovery, the option ROM hooks INT13h vector for redirection of SCSI commands to FCoE or iSCSI disks during system boot. If the BIOS is disabled, then this process is skipped. The same procedure is repeated for iSCSI. Once all BEV entries and BCV entries are initialized, the user can enter the system setup and choose the boot device of his choice, and the boot process can be continued.

In one embodiment, a maximum of 8 boot devices are supported in this architecture, and the boot devices can come from either PXE, FCoE or iSCSI, or all, and from any of the T4 adapters present on the system.

The option ROM also has a user interface to configure and set up boot devices for boot. This is the configuration utility which can be entered by pressing 'alt-c' when prompted for the same. This utility uses the flash module present in Chelsio T4 adapters to read and write to flash memory. All T4 adapters present on the system can be configured here, which enables the user to set up boot devices at one place without having to configure each adapter.

This design of one option ROM image serving all adapters present on the system eliminates the effort required to update each adapter with an option ROM image, and reduces the memory footprint as only one option ROM image is loaded into memory, and initialized leaving space for other option ROMs to load and initialize.

This design of single option ROM image may be used to serve all boot solution to CNA based PCIe adapters, and thus eliminates the effort required to update each function with an option ROM image, and reduces the memory foot print as only one option ROM is loaded into memory and initialized, leaving space for other option ROM to load and initialize.

Second and Third Example Adapter/CNAs and Method

Figure 4:
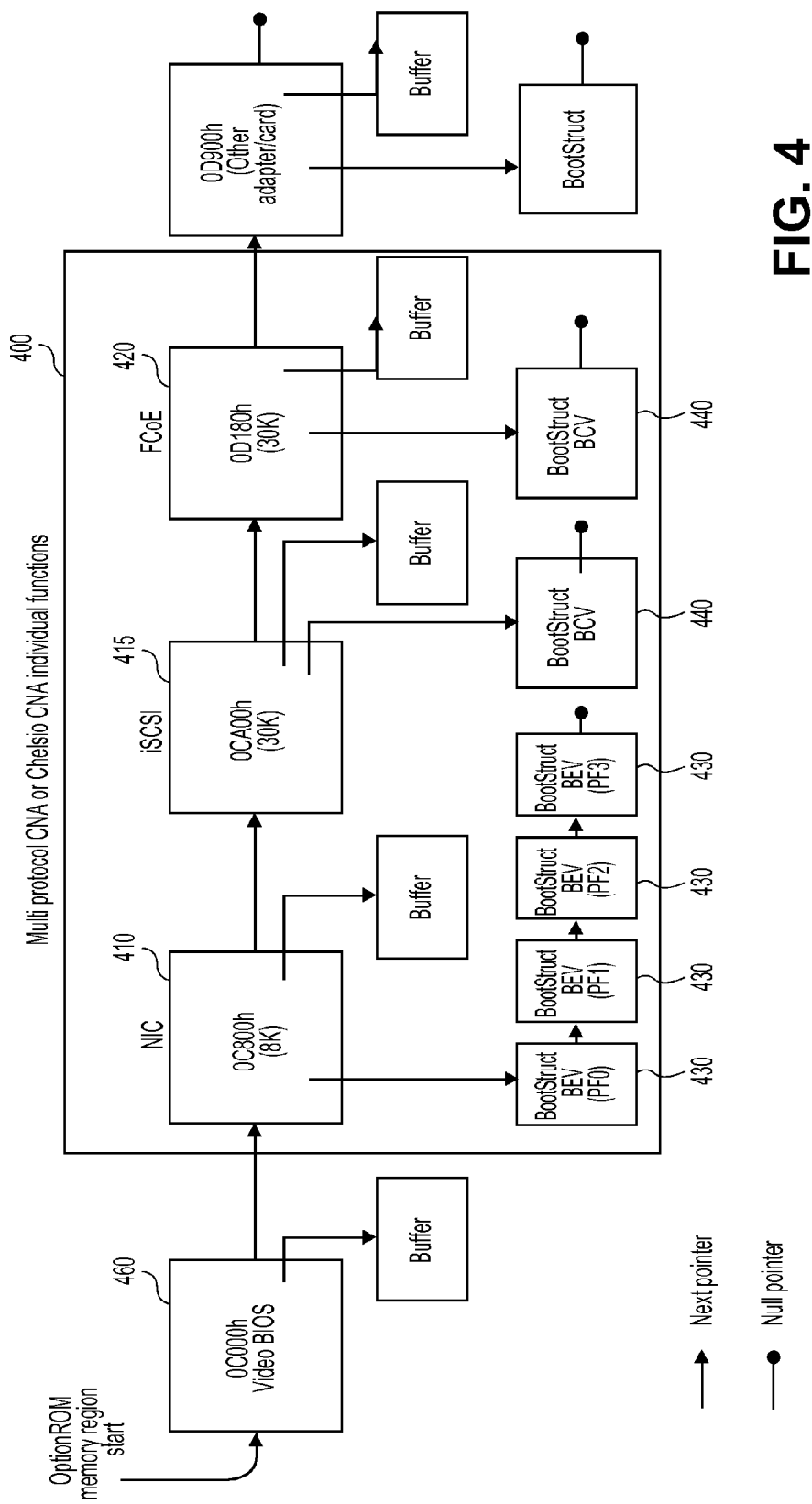
FIG. 4 illustrates an example of a multi-protocol converged network adapter showing modules for individual CNA functions in accordance with one embodiment of the present invention.
Figure 5:
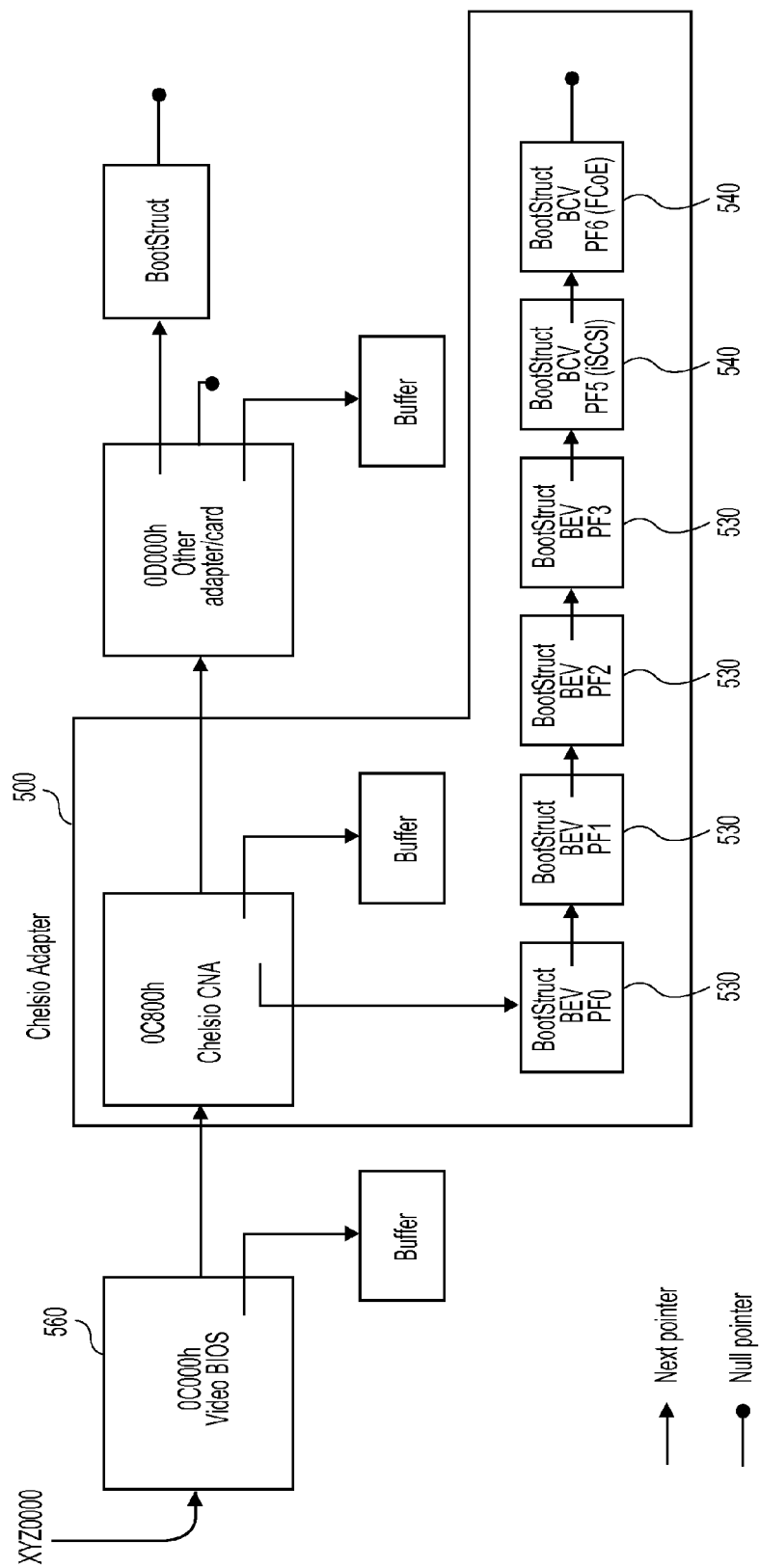
FIG. 5 illustrates another example of an adapter in accordance with an embodiment of the present invention.

CNA cards may be implemented in different ways, as illustrated in FIGS. 4 and 5.

FIG. 4 illustrates a multiprotocol CNA 400 showing individual NIC 410, iSCSI 415, and FCoE 420 functional modules, buffers, BEV Boot structures 430 (corresponding to PF0 to PF3), BCV boot structures 440, and an option ROM 460. The next pointers and null pointers are also illustrated.

FIG. 5 illustrates another example of a CNA 500 and BEV 530 boot structures corresponding to PF0 to PF3 and BCV 540 boots structure functions corresponding to PF5 (iSCSI) and PF6 (FCoE). Also illustrated are the next pointers and null pointers and an option ROM 560

In one embodiment, a method of configuring and booting for various protocols like, but not limited to, PXE, iSCSI and FCoE on multi-function Converged Network Adapter (CNA) card are provided. The CNA card includes a flash storage chip, eight physical functions (PF0-PF7) and a Converged Protocol Processor.

The CNA card is coupled to peripheral connect interface (PCIe) bus of a computer system and is a multi-function card. With respect to boot, the CNA is interconnected with 4 network functions and two storage functions, namely four out of the eight PF0-PF7 functions, and the storage functions Fiber Channel over Ethernet (FCoE) and Internet SCSI (iSCSI). The CNA's flash storage chip is exposed through Expansion BAR register in PCI configuration space.

The computer system has system memory. The method includes booting the computer system and passing control to the system BIOS Power On Self Test (POST). The POST scans each of the PCI devices by reading the code from flash through the Expansion BAR register. The POST identifies the CNA's PF0 as one of the PCI devices by reading the code from flash through Expansion BAR register. The PF0 reads the flash storage chip to execute a piece of code previously written to the flash storage chip. After validating the image the control passes to a piece of the code.

A main portion of code previously written resides in flash hidden sectors. Piece of the code loads a main portion of code to the system memory of the computer system to enable interoperability of the CNA card with the computer system.

The main code communicates to each of the PFs and configures the Boot Entry Vector for NIC functions, and Boot Connect Vector (BCV) for FCoE and iSCSI targets. The BEV and BCV are chained through a Plug and Play (PnP) Expansion header.

After the BEV's and BCV's are chained, the control goes back to POST. The POST calls each BCV's to hook INT 13h vector. Then POST prepares the Initial Program Loader (IPL) boot devices table and gives a control to boot (INT 19h) processing. The INT19h gives control to the first IPL device that succeeds and will load the Operating System (OS). If IPL device fails to boot, the INT19h regains control and selects the next IPL in the IPL priority. This process continues until all IPL devices have failed.

Figure 6A:
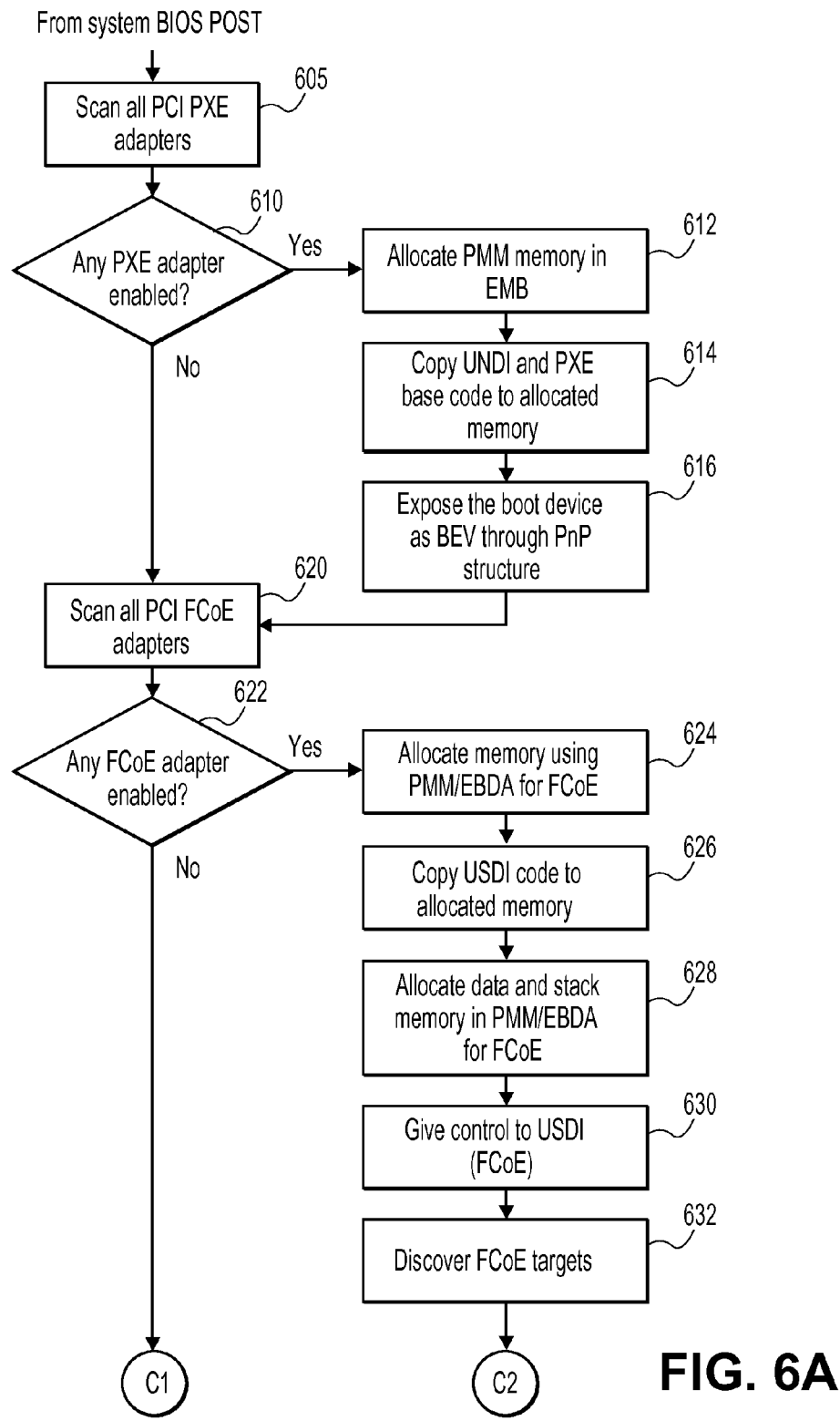
FIGS. 6A, 6B, and 6C illustrate a method in accordance with an embodiment of the present invention.
Figures 6B, 6C:
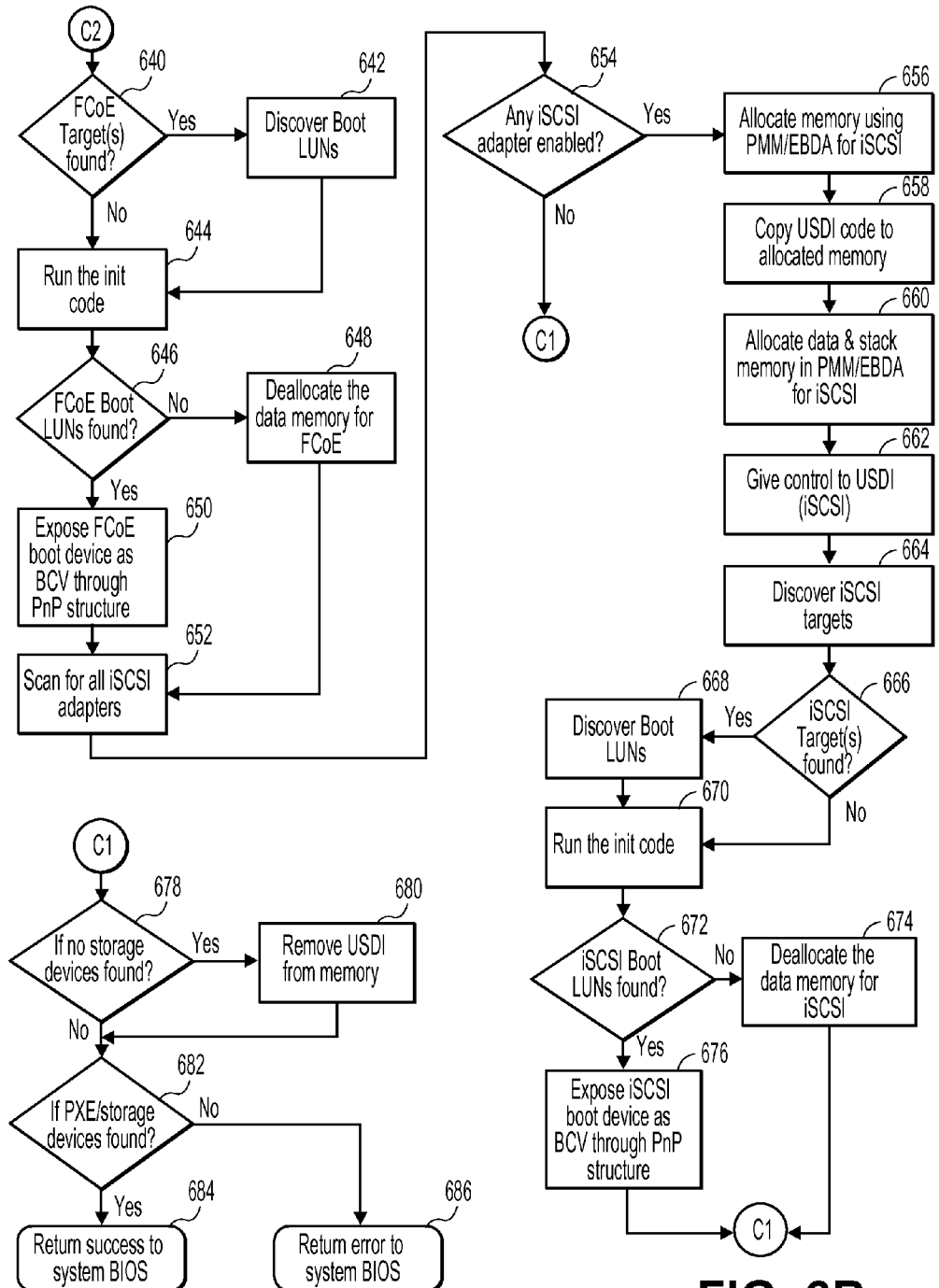

Exemplary Option ROM Initialization During BIOS POST:

FIGS. 6A and 6B are flowchart of an exemplary method for the CNA option ROM initialization during BIOS POST, in which the system BIOS POST scans for different types of PCI adapters (PXE, FCoE, and iSCSI), allocates memory, and discovers targets. For the case of FCoE and iSCSI, if these targets are found, the function (FCoE or iSCSI) then the corresponding boot device is exposed as BCV through PnP structure.

A scan 605 is performed of all PCI PXE adapters. If any PXE adapters are enabled, then an allocation 612 of POST Memory Manager (PMM) memory is made in an extended memory block (EMB). UNDI and PXE based code are copied 614 to allocated memory. The boot device is exposed 616 as BEV through PnP structure.

The process then checks if any FCoE adapters are enabled in step 622. If yes, the memory is allocated for the FCoE 624, the USDI code is allocated to memory 626, control is given to USDI 630, and FCoE targets are discovered 632. If FCoE targets are found 640, then the Boot LUNs are discovered 642. The initialization code is run 642. A determination is made 646 whether FCoE boot LUNs are found. If no FCoE are found, there is a deallocation 648 of data memory for FCoE. If FCoE is found, then the process exposes 650 FCoE boot device as BCV through PnP structure.

A scan 652 is made for all iSCSI adapters and whether any iSCSI adapters are enabled 654. If yes, memory is allocated 656 using PMM/EBDA for iSCSI, USDI code is copied 658 to allocated memory, an allocation is made of date and stack memory in PMM/EBDA for iSCSI 660, control is given to USDI (for iSCSI) 662, and iSCSI targets are discovered 664. A determination is made whether iSCSI targets are found 666 and, if so, the Boot LUNs are discovered 668. The initialization code is then run 670. A determination is made whether iSCSI boot LUNs are found. If no iSCSI boot LUNs are found, the memory for iSCSI is deallocated 674. Otherwise, iSCSI boot device is exposed 676 as BCV through PnP structure.

As illustrated in FIG. 6C, a determination is made whether no storage device were found 678. If yes, USDI is removed from memory 680. If no, a determination is made 682 whether PXE/storage devices found. If yes, a success 684 is returned to the BIOS. If no, an error is return to the BIOS 686.

As a result of the conclusion of the process, the CNA option ROM listed boot devices are shown in the BIOS setup screen.

Figure 7:
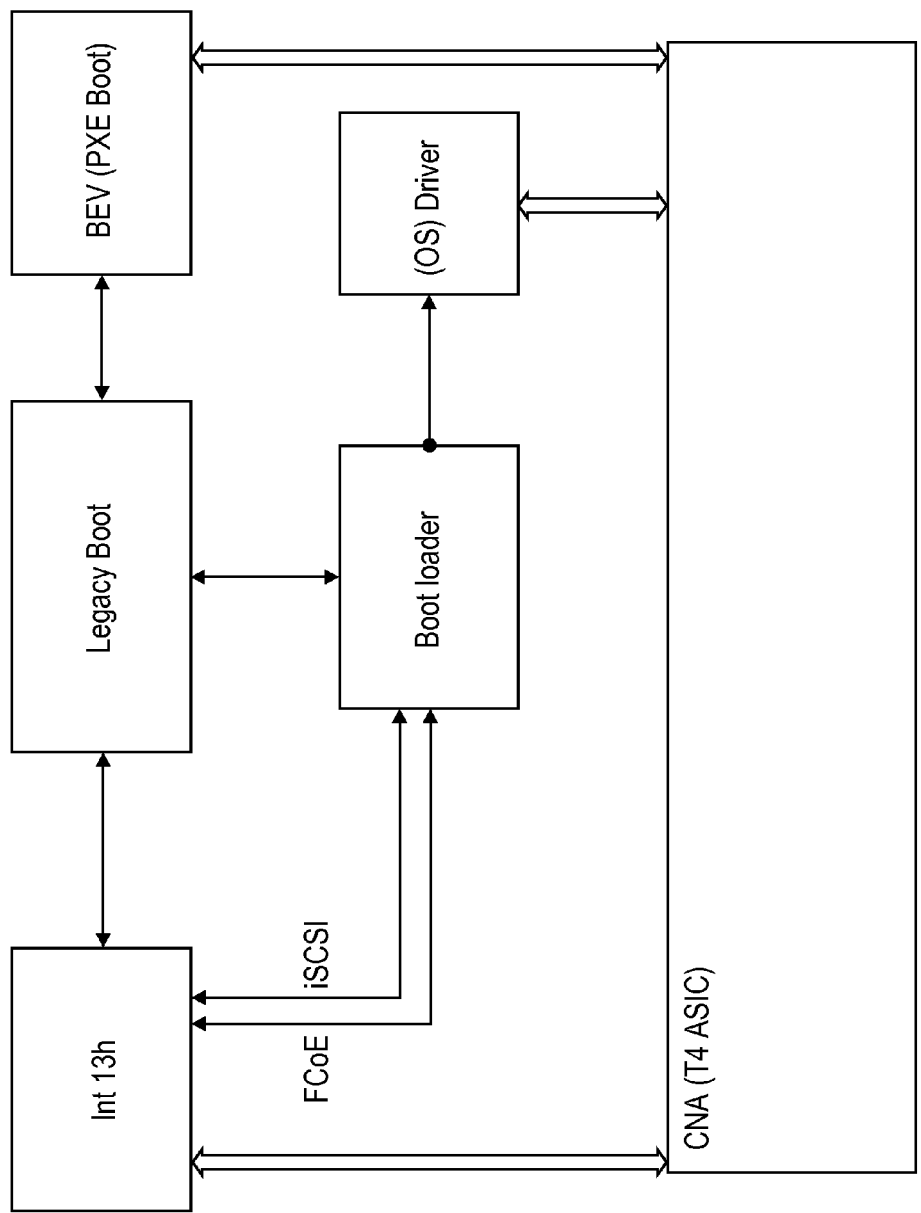
FIG. 7 illustrates legacy booting in accordance with an embodiment of the present invention.

FIG. 7 illustrates a runtime flow diagram of a legacy boot option during a boot (INT 19h) process.

Exemplary Steps for BIOS Scan for PCI Option ROM Image from CNA:

A detailed example of steps for a BIOS scan of a PCI option ROM image for the POST pertinent to PCI expansion ROMs will now be described. The POST Firmware goes through several steps to configure a PCI Expansion ROM. These steps are described below:

1. The POST Firmware examines the PCI bus topology to individually examine each PCI device. If the device has implemented an Expansion ROM Base Address register in Configuration Space, then the POST firmware proceeds to the next step.

Note that individual functions on a multi-function PCI Device may each have an Expansion ROM Base register implementation. Note that the order in which PCI Devices are examined and initialized is not defined, i.e. the order is unpredictable and can be different on subsequent executions of this step.

2. The POST firmware enables the Expansion ROM at an unused memory address.

3. The POST firmware checks the first two bytes in the Expansion ROM for the AA55h signature. If that signature is found, then there is a ROM present. Otherwise, no ROM is attached to the device, and the POST firmware proceeds to step 10.

4. If a ROM is attached, the POST firmware must search the ROM for an image that has the proper Code Type. The following steps can be used to search multiple images. If the pointer is valid (non-zero), examine the target location of the pointer. If the pointer is invalid, no further images can be located. The target location must contain the signature string "PCIR." If a valid signature is not present, no further images can be located. If the signature string is valid, examine the Code Type field to determine if it is correct for the expected type of execution environment. (Refer to the Code Type field entry for more information). If the Code Type field is not appropriate, then the BIOS needs to continue searching for Images as described in the next step. If the Code Type field is appropriate, the BIOS proceeds to step 5 below. The BIOS should then examine the "Last Image" field to determine if more images are present. If no further images are present, the BIOS should proceed to step 9. If more images are present, the Image Length field should be examined to determine the starting location of the next image. The Image Length is added to the starting address of the current image (not Image 0). Note that Image Length is in units of 512 bytes. The BIOS proceeds to step 3 above.

5. After the correct image has been selected, POST Firmware will verify that the Vendor ID and Device ID fields match the corresponding fields in the device.

6. If the Vendor ID matches but the Device ID does not, the POST Firmware will examine the Device List Pointer. Assuming the Device List Pointer is not zero, the POST firmware will examine the Device List to find a match to the Device ID in the device. A value of 0000h indicates the end of the Device List.

Note that only PCI Firmware 3.0 compliant Expansion ROMs support the Device List Pointer. The POST Firmware should not examine the Device List Pointer field until it has confirmed that the PCI Data Structure Revision Level is 3 or greater.

7. After finding the proper image, the POST Firmware determines if there is sufficient space for the image to be copied into RAM in preparation for initialization. This is accomplished by examining the Maximum Run-Time Image Length field.

Note that only PCI Firmware 3.0 compliant Expansion ROMs support the Maximum Run-Time Image Length field. POST Firmware should not examine the Maximum Run-Time Image Length field until it has confirmed that the PCI Data Structure Revision Level is 3.

Note that if the image is a PCI 2.1 compliant Expansion ROM, the POST firmware must continue examining the images to determine if a PCI 3.0 compliant Expansion ROM exists for the same Vendor ID and Device ID. PCI 2.1 compliant Expansion ROMs must only be used by the POST firmware when a PCI 3.0 compliant Expansion ROM cannot be found.

8. The System firmware must confirm that the Option ROM image has a valid checksum before copying it into RAM. This checksum is calculated using Current Image Size.

9. The POST firmware then copies the appropriate amount of data into RAM. The amount of data to copy is determined by examining the Image Length field in the PCI Data structure in the header.

10. The POST firmware then disables the Expansion ROM Base Address register. Subsequent steps will vary depending on the value of the Code Type field.

Exemplary Steps for BIOS Scan for PCI Option ROM Image from CNA:

The POST firmware copies the entire option ROM image into a RAM address. The RAM address can vary depending on whether the option ROM identifies itself as being PCI Firmware 3.0 Specification compliant. (A value of 03h in the PCI Data Structure Revision field indicates compliance.)

If the option ROM is compliant, then the following steps will be followed by the POST Firmware:

1. POST Firmware will place the option ROM in RAM at an address that may not be the final run-time execution address. This address will be below the 1-MB address boundary.

2. The POST firmware will then call the INIT function entry point and supply the arguments.

3. As part of the INIT function, the option ROM code must place the final run-time option ROM image into the run-time address provided by the POST firmware. Note that the option ROM code must ensure that the device is quiescent until the interrupt service routine is in place at the final run-time location. Caution must be taken in chaining the interrupt service routine. It is possible that an interrupt may arrive while the interrupt service routine is being installed.

4. The POST Firmware will not write-protect the RAM containing the run-time Expansion ROM code at this step. In a PCI Firmware 3.0 compliant system, the write-protection step will be delayed until the Setup portion of the Expansion ROM code, if any, has been executed.

5. The POST firmware will erase the old image from the temporary RAM location.

Definitions:

BIOS Services

The BIOS provides various software routines or sub programs that are called by high-level software like OS, that are known as BIOS services. BIOS services are accessed using software interrupts, which is similar to the hardware interrupts except they are generated inside the processor by programs instead of being generated outside the processor by hardware devices.

INT 13h

When OS or an application wants to access the hard disk, it employs BIOS services to do this. The primary interface to the BIOS has been the software interrupt known as INT 13h

BEV

A Bootstrap Entry Vector is a pointer that points to code inside an option ROM that will directly load an OS. The BEV resides in a PnP option ROM Expansion Header. An example of an option ROM with a BEV is a PCI Ethernet controller.

BCV

A Boot Connection Vector is a pointer that points to code inside the option ROM that will perform device initialization, detect if a peripheral (such as a SCSI hard drive) is attached, and optionally hook INT 13h. The BCV resides in a PnP option ROM Expansion Header. An example of an option ROM with a BCV is a PCI SCSI controller.

CNA

A Converged Network Adapter is a multifunction PCIe Adapter that support more than one protocol such as NIC, iSCSI, FCoE, etc., Initialization Code This is a part of the option ROM that the BIOS call during Power On Self Test (POST). It verifies the NIC, iSCSI and FCoE Configuration and signals the BIOS that NIC is BEV bootable device where as iSCSI or FCoE is BCV Bootable device. It is the part of all Expansion-Rom Image.

Base Code

This is the runtime code that controls the execution of PXE boot and includes the actual PXE Protocol functions. This module is not hardware-specific and operates with any Universal Network Device Interface (UNDI driver)

UNDI Driver

This is UNDI and is just the driver for the NIC functions.

USDI Driver

Universal Storage Device Interface is the INT13h driver for the FCoE and ISCSI functions. This can be extended to any other storage protocol. It does the following
1. Initialize the hardware.
2. Provides interface to discover targets/LUNs.
3. Converts INT13h to SCSI interface to execute the SCSI functions through FCoE/iSCSI transport.

Provides interface to Configuration utility to configure the boot devices.

INCORPORATION BY REFERENCE

The following references are hereby incorporated by reference regarding background information:
1. BIOS Boot Specification Version 1.01.
2. Plug and Play BIOS Specification Version 1.0A.
3. Preboot Execution Environment (PXE) Specification Version 2.1.
4. Post Memory Manager (PMM) specification Version 1.01.
5. PCI Firmware specification Revision 3.1.

ALTERNATE EMBODIMENTS

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of configuring and booting a computer system having a computer and a multi-function converged network adapter card coupled to the computer, the converged network adapter card including a set of at least two network interface ports to access, via a network, at least one of a preboot execution environment server target, an iSCSI target, and a Fiber Channel Disk Array target, comprising:
reading, in response to a Power-On Self Test (POST) of the system BIOS of the computer, a single option ROM associated with the converged network adapter (CNA) card to obtain information for booting and configuration, the single option ROM storing information to support a preboot execution environment (PXE) boot, a Fiber Channel Over Ethernet (FCoE) boot, and an Internet Small Computer Interface (iSCSI) boot;
discovering external targets communicatively coupled to the set of at least two network interface ports;
using the single option ROM to automatically configure a plurality of network and storage adapters present on the computer system including configuring a plurality of different types of storage adapters to support communication with one or more of the discovered external targets communicatively coupled to the set of at least two network interface ports wherein an initialization routine stored on the single option ROM is called by the BIOS to scan for different types of adapters present from the group consisting of PXE, FCoE, and iSCSI;
wherein the single option ROM has a sequence of images to support all of the protocols of the adapters of the CNA and support all of the boot solutions for the converged network adapter card; and
wherein the network and storage protocols includes the Internet Small Computer System Interface (iSCSI), Fiber Channel Over Ethernet (FCoE);
wherein in response to discovering a PXE server target a PXE adapter is automatically exposed as BCV through a PNP structure, wherein in response to discovering an iSCSI target an iSCSI adapter is automatically exposed as BCV through a PNP structure, and wherein in response to discovering a FCoE target, a FCoE adapter is automatically exposed as BCV through a PNP structure.

2. The method of claim 1 wherein the single option ROM stores at least a universal stored device interface (USDI) driver, boot configuration information for all protocols supported by the converged network adapter; a preboot execution environment (PXE), and a universal network device interface (UNDI) and based code driver supporting NIC functions.

3. The method of claim 1, wherein the converged network adapter (CNA) card is coupled to a peripheral component interface express (PCIe) bus of the computer and the single option ROM image is used to serve all boot solutions for CNA based PCIe adapters.

4. The method of claim 1, wherein an initialization routine stored on the single option ROM is called by a BIOS to read configuration parameters on each adapter found and setup PXE BEV entries and storage BCV entries based on the configuration parameters.

5. The method of claim 1, wherein the reading of the single option ROM comprises the system BIOS in a Power-On-Self-Test (POST) scanning the single option ROM and reading a main portion of code stored on the option ROM to enable interoperability of the computer with the converged network adapter card.

6. The method of claim 5, wherein the main portion of code communicates to each physical function (PF) of the converged network adapter card and configures a Boot Entry Vector (BEV) for Network Interface Card (NIC) functions, and Boot Connect Vector (BCV) for FCoE and iSCSI targets.

7. The method of claim 6, wherein the BEV and BCVs are chained through a Plug and Play (PNP) expansion header.

8. The method of claim 7, further comprising the POST calling each BCV to hook INT 13h vector.

9. An apparatus, comprising:
a multi-function converged network adapter card including a plurality of network interface ports to communicate with one or more external targets selected from the group consisting of PXE, FCoE, and iSCSI; and
a single option ROM associated with the converged network adapter (CNA) card to provide information for booting and configuration, triggered by a Power-On Self Test (POST) of the system BIOS of a computer, to automatically configure a plurality of different types of adapters communicatively coupled to the plurality of network interface ports;
wherein the single option ROM stores a sequence of images to: 1) support configuring and booting the network interface card (NIC) and storage protocols supported by the converged network adapter card and 2) support all of the boot solutions for the converged network adapter card including supporting a preboot execution environment (PXE) boot, a Fiber Channel Over Ethernet (FCoE) boot, and an Internet Small Computer Interface (iSCSI) boot;
wherein an initialization routine stored on the single option ROM is called by a BIOS to scan for different types of adapters, allocate memory, discover external targets, coupled to the plurality of network interface ports, the external targets including one or more members selected from the group consisting of PXE targets, FCoE targets, and iSCSI targets, and expose, as BCV through a PNP structure, corresponding adapters for each discovered external target, wherein the initialization routine reads configuration parameters on each adapter found and setups PXE BEV entries and storage BCV entries based on the configuration parameters;
wherein the single option ROM has a sequence of images to support all of the protocols of the adapters of the CNA and support all of the boot solutions for the converged network adapter card to communicate with the discovered targets.

10. The apparatus of claim 9, wherein a main portion of code stored on the option ROM enables interoperability of a computer with the converged network adapter card.

11. The apparatus of claim 1, wherein the BEV and BCVs are chained through a Plug and Play (PNP) expansion header.

* * * * *